3,361,796
PRODUCTION OF PERACETIC ACID
Donald Arthur Sharman, Coventry, and Trevor Frederick
Bridges, Sapcote, Leicester, England, assignors to Courtaulds Limited, London, England, a British company
Filed Oct. 29, 1964, Ser. No. 407,356
Claims priority, application Great Britain,
Nov. 11, 1963, 44,348/63
3 Claims. (Cl. 260—502)

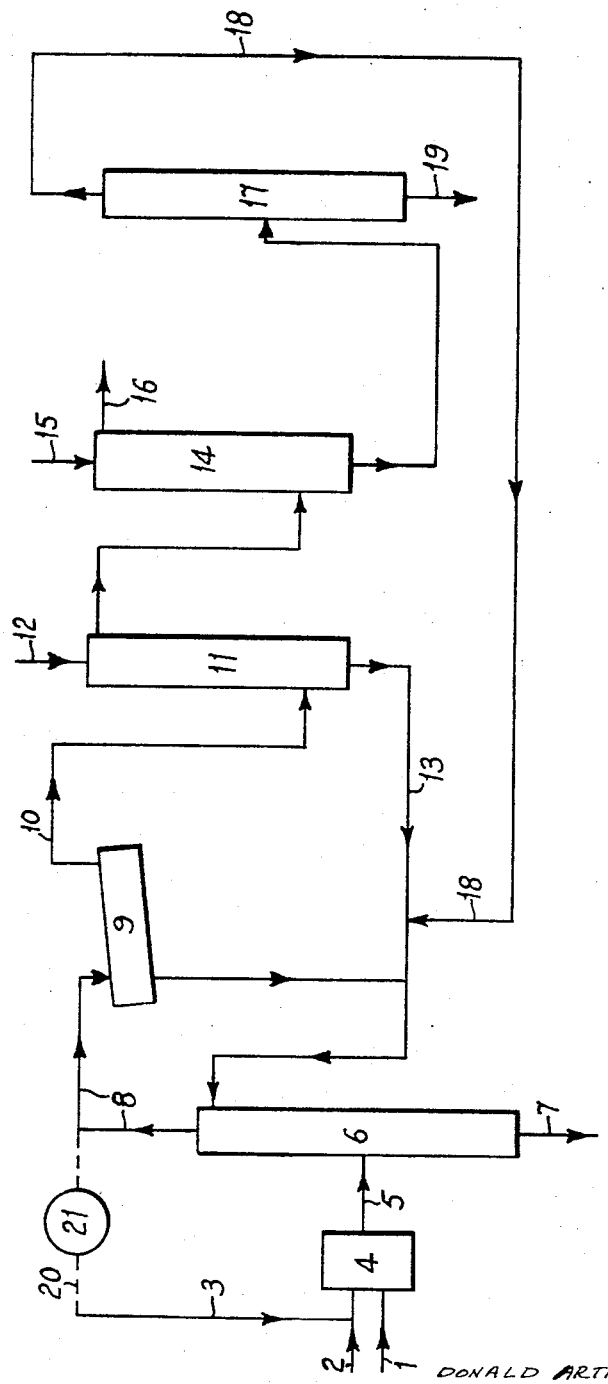

ABSTRACT OF THE DISCLOSURE

In the manufacture of peracetic acid by the vapour phase oxidation of acetaldehyde, followed by solvent extraction of the peracetic acid in a column, excess acetaldehyde is recovered by scrubbing the gas beyond the condenser stage with the solvent which is used to dissolve out the peracetic acid and the solution obtained is fed to the column to provide the solvent feed.

---

This invention relates to the production of peracetic acid.

It is already known, see for example United States patent specification No. 2,314,385, to react acetaldehyde with oxygen in a vapour phase reaction to produce peracetic acid; the acetaldehyde is used in a large excess with the object of reducing the risk of explosion in carrying out the reaction.

The usual method of recovering the peracetic acid is to pass the reaction product direct to a distillation column to which a solvent for the peracetic acid, for example acetone, is fed, so that a solution of the peracetic acid, together with some acetic acid which is inevitably also present, in the solvent is removed from the base of the column. Other solvents which may be used are methylal, methyl acetate and ethyl acetate.

The unreacted acetaldehyde, together with various incondensible gases (for example carbon dioxide, nitrogen, carbon monoxide, methane and unreacted oxygen) and possibly also some of the solvent, depending on the temperature of the top of the column, passes to a partial condenser which serves to return some of the acetaldehyde and most of any solvent present to the column as a reflux stream.

Several methods are available for recovering most of the excess acetaldehyde, but invariably some acetaldehyde vapour passes over with the incondensible gases and the acetaldehyde is generally recovered as far as possible by means of a water scrubber and the aqueous acetaldehyde solution so produced is subsequently distilled to recover the acetaldehyde ready for recirculating.

It is economically desirable to reduce this flow of acetaldehyde to the water scrubber and in accordance with this invention, this is done by scrubbing and condensing the acetaldehyde vapour from the condenser with the solvent to be used to dissolve the peracetic acid (which would otherwise be fed direct to the column), and the solution so obtained is fed direct to the distillation column; for example, it may be fed to the reflux stream. When solvent also passes over from the distillation column to the partial condenser with the acetaldehyde vapour, the acetaldehyde referred to above would be accompanied throughout by the solvent.

Any residual acetaldehyde and solvent passing from the scrubber-condenser with the incondensible gases may be subsequently water scrubbed and recovered according to previous practice, but the quantity of material having to be recovered is now reduced for any given temperature of the water which is available for cooling the partial condenser and the scrubber-cooler.

The process according to this invention will now be described, by way of example, with reference to the accompanying drawing, the single figure of which is a flowsheet illustrating the use of acetone as the solvent, this being the preferred solvent, part of the acetone being recycled with the acetaldehyde in accordance with the process described in Patent No. 3,210,460. Parts are by weight per unit time.

Referring to the drawing, 1 part of oxygen, by way of a pipe 1, and 1 part of fresh acetaldehyde by way of a pipe 2 together with 10 parts of recycled acetaldehyde (which may be a mixture of acetaldehyde with acetone) produced as described below, by way of a pipe 3 are fed to a reactor 4 to produce a reaction product containing peracetic acid. This product passes through a pipe 5 to a distillation column 6 having a base temperature of 60° to 70° C. and a head temperature of about 30° to 40° C. The required peracetic acid solution in acetone (6 parts) is withdrawn from the column 6 through a pipe 7. Acetaldehyde vapour containing about 30 percent by weight of acetone, is passed through a pipe 8 to a condenser 9 at a temperature, for example 21° C., sufficient to condense acetaldehyde and acetone, this acetaldehyde forming, as shown, part of the reflux to column 6. Acetaledhyde vapour containing some acetone and incondensible gases leaving the condenser 9 passes by way of a pipe 10 to the base of an acetone scrubber-condenser 11 fed at the top with 4 parts of acetone from a pipe 12, the condenser being cooled to 21° C. to 22° C. The scrubber-condenser may conveniently consist of a water-cooled metal tube containing ¼ inch diameter packing rings. The acetone solution of acetaldehyde so obtained is then passed into the reflux stream to column 6 by way of a pipe 13 which also receives the solution from condenser 9. Residual acetaldehyde, residual acetone and the incondensible gases may be vented direct to waste or, as shown, may be water-scrubbed in a scrubber 14 fed at the top with water from a pipe 15. Incondensible gases are vented to atmosphere through a pipe 16 and the aqueous solution of acetaldehyde and acetone is distilled in known manner in a column 17, the acetaldehyde and acetone being passed as a liquid stream from column 17 into pipe 13 by way of a pipe 18 to join the solution passing into the reflux stream; the water leaves the column 17 through a pipe 19. Alternatively, instead of feeding the acetaldehyde-acetone solution with the reflux stream, the solution may be fed to an intermediate point of column 6, preferably between pipe 5 and pipe 13.

It is necessary to recycle some acetaldehyde to the reactor. In the process illustrated in the drawing this is effected by recycling acetaldehyde vapour, containing some acetone, from the column 6 to the reactor 4 by way of a pipe 20 (shown in dotted line), pipe 3 and pipe 2; if desired it may be passed direct to the reactor 4 instead of into pipe 2. A fan 21 is included to recycle the vapour back to the reactor.

A vapour feed may be recycled to the reactor from pipe 10 direct to the fan 21 or a liquid feed may be recycled from the condensate leaving the condenser 9 this stream being vapourised before injection into the reactor. If desired the acetaldehyde may be recycled by a combination of any two or all three of the methods of recycling just described.

If desired a compressor, such as a fan or blower (not shown) may be incorporated in the condenser system, for example in the pipe joining the scrubber-condenser 11 to the scrubber 14 or in the pipe 10, (a) to offset the effect of back-pressure on the column 6 and/or (b) to increase the pressure for condensation and scrubbing.

An example of the process using the apparatus shown in the drawing but with the recycle acetaldehyde free from solvent is as follows. The temperature of the head of the column 6 was 21° C. and the temperature of the scrubber-condenser 11 was about 23° C., being externally cooled by water at 21° C. A mixture of 10 parts of acetaldehyde and 1 part of incondensible gases was passed into the scrubber-condenser 11, together with 7 parts of acetone from pipe 12. The gaseous mixture leaving the scrubber-condenser 11 and passing to scrubber 14 contained 1 part of incondensible gases and 2 parts of other vapours, 30 percent of which was acetaldehyde. The condensate, passed into the reflux stream by way of pipe 13, was 15 parts of an acetone solution containing 60 percent of acetaldehyde.

What we claim is:

1. In a process for the production of peracetic acid by reacting an excess of acetaldehyde and oxygen in the vapour phase to produce a reaction mixture containing peracetic acid, acetic acid and unreacted acetaldehyde, passing the reaction mixture so produced to a distillation column to which a solvent for the peracetic acid selected from acetone, methylal, methyl acetate and ethyl acetate is fed whereby a solution of peracetic acid and acetic acid in the solvent is formed and removed from the base of the column and a gaseous stream containing acetaldehyde and solvent passes over from the top of the column, passing the gaseous stream from the distillation column to a partial condenser to condense some of the acetaldehyde and solvent in the gaseous stream and feeding the resultant liquid condensate of acetaldehyde and solvent from the partial condenser back to the distillation column, the improvement which consists in passing the uncondensed vapours containing acetaldehyde from the partial condenser to a scrubbing column to which the solvent to be used to extract the peracetic acid is fed whereby a solution of acetaldehyde in the said solvent is formed in the scrubbing column and passing the solution of acetaldehyde so formed from the scrubbing column to the distillation column to provide the solvent feed to the distillation column.

2. A process as claimed in claim 1 wherein the vapour containing acetaldehyde passing over from the condenser also contains the solvent used to dissolve out the peracetic acid.

3. A process as claimed in claim 1 wherein residual acetaldehyde passing from the solvent scrubbing step is recovered by scrubbing the vapour with water and distilling the resultant aqueous solution.

References Cited

UNITED STATES PATENTS

| 1,580,137 | 4/1926 | Hancock | 260—530 |
| 3,201,460 | 8/1965 | Beesley et al. | 260—502 |

FOREIGN PATENTS

| 547,333 | 8/1942 | Great Britain. |
| 633,038 | 12/1961 | Canada. |

LORRAINE A. WEINBERGER, *Primary Examiner.*

M. WEBSTER, *Assistant Examiner.*